Sept. 18, 1951 J. M. CAGE 2,568,485

POWER SUPPLY FOR IMAGE REPRODUCING TUBES

Filed Nov. 29, 1947 2 Sheets-Sheet 1

INVENTOR
JOHN M. CAGE
BY
Bartlett Eyre Keel & Weymouth
ATTORNEYS

Sept. 18, 1951 J. M. CAGE 2,568,485

POWER SUPPLY FOR IMAGE REPRODUCING TUBES

Filed Nov. 29, 1947 2 Sheets-Sheet 2

INVENTOR
JOHN M. CAGE
BY
Bartlett Eyre Keel & Weymouth
ATTORNEYS

Patented Sept. 18, 1951 2,568,485

UNITED STATES PATENT OFFICE 2,568,485

POWER SUPPLY FOR IMAGE REPRODUCING TUBES

John M. Cage, Montclair, N. J., assignor to Cage Projects, Inc., Union City, N. J., a corporation of New Jersey Application November 29, 1947, Serial No. 788,818

7 Claims. (Cl. 321—2)

This invention relates to electronic circuits and is particularly useful for electron-optical applications such as television equipment and other purposes.

One of the problems presently encountered in television equipment and particularly where projection type tubes are used, is the generation of high electron beam accelerating voltages. Conventional practice where voltages of the order of 20,000 to 30,000 volts and even higher are required, is to use a voltage multiplier-rectifier circuit powered by a radio frequency oscillator. In these circuits two or more rectifier tubes are used to rectify and step up or multiply voltage generated by a radio frequency oscillator. Since the rectifier tubes operate at different potentials it has been the practice to my knowledge to use tubes having low filament power requirements and heat them by the radio frequency currents flowing through the circuits associated with several tubes in the multiplier circuit.

The foregoing procedure has several disadvantages, namely, that special low power rectifier tubes are required, power is simultaneously applied to the plate and filament of each tube thereby greatly impairing its life, and the radio frequency circuits for heating each tube are critical and must be carefully tuned to the oscillator frequency for optimum results.

I have also found that this conventional procedure also introduces a certain amount of picture distortion when used with image reproducing tubes because of the radio frequency signal. It has therefore been customary to take elaborate precautions to shield the oscillator and multiplier, filter the output voltage, and adjust the frequency of the oscillator whereby minimum interference with the television receiver will result.

With my invention I have been able to overcome these difficulties encountered in conventional multiplier type power circuits and greatly improve their stability and dependability and lengthen the life of the rectifier tubes.

For a better understanding of the invention and its objects, reference may be had to the following description and drawings forming part of the application.

In the drawings—

Figure 1:
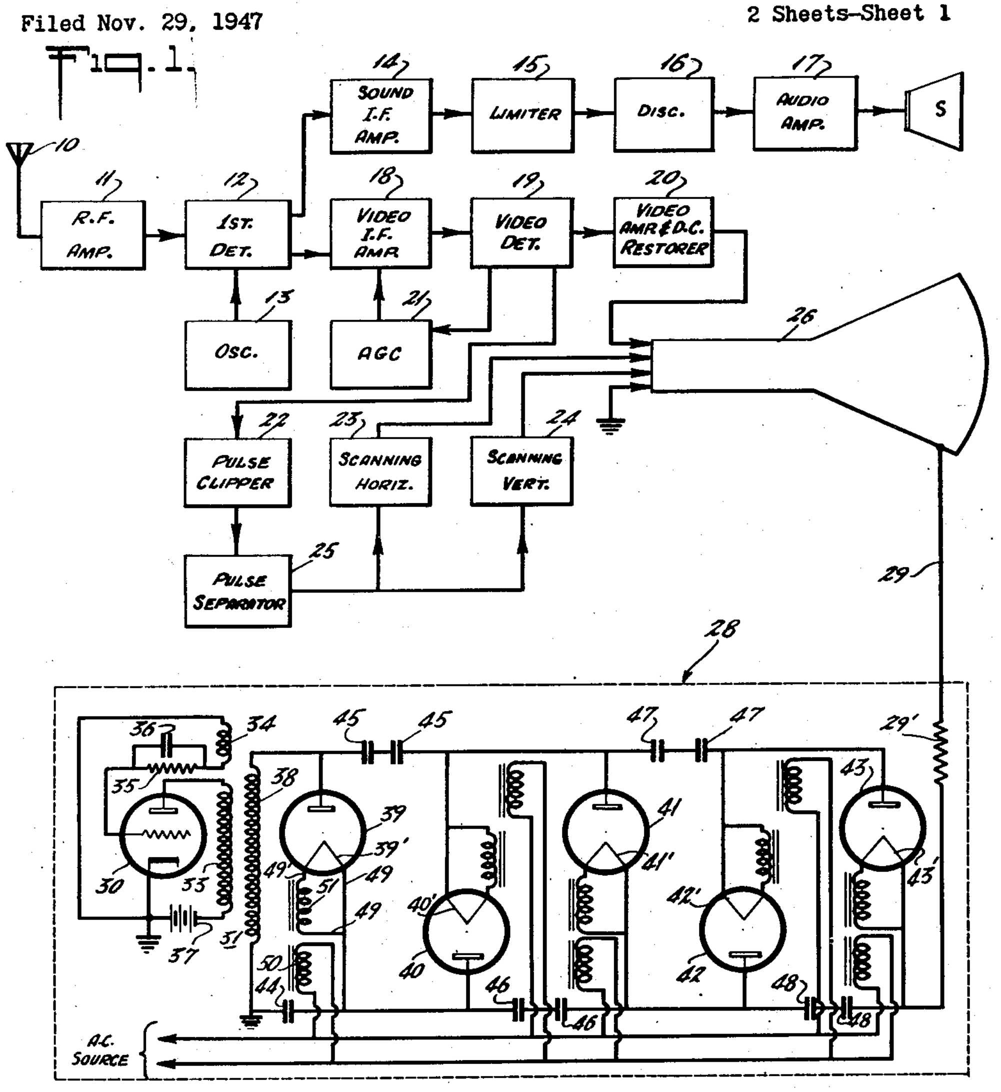
Fig. 1 is a diagrammatic illustration of one embodiment of the invention.

As an example of one application of my invention I have illustrated in Fig. 1 a block diagram of a television receiver and a circuit diagram of the high voltage power circuit for the image reproducing tube which embodies the principle of the invention. The receiver is of the conventional type and a detailed description of each component is not deemed necessary. It includes a receiving antenna 10, a radio frequency amplifier 11 and a first detector 12 and oscillator 13. The output signal obtained from the detector 12 is divided into two channels, one feeding the sound channel having an intermediate frequency amplifier 14, a limiter 15, discriminator 16, audio amplifier 17 and loud speaker S, and the other feeding the video channel including an intermediate frequency amplifier 18, a video detector 19 and a video amplifier and direct current restorer 20. The output of the restorer 20 connects with the image reproducing tube whether of projection or non-projection type. This signal operates to vary the electron beam current while it scans the face of the tube to form the image.

Between the video amplifier 18 and video detector 19 is an automatic gain control 21 operable to control the level of the video signal. A part of the output of the detector 19 is fed through a pulse clipper 22 and pulse separator 25, whereupon it is treated by horizontal and vertical scanning circuit elements 23 and 24 which in turn are connected with the tube 26 to cause the electron beam to scan the face of the tube in synchronism with beam in the image pickup tube at the television broadcast station which records or televises the original object.

In addition to applying signals to the image reproducing tube 26, it is necessary to supply other voltages for energizing the filament, focusing the electron beam and accelerating the beam so that the electrons will strike the screen at the desired velocity. This last mentioned accelerating voltage is usually of the order of many thousands of volts and in some instances may be in the range of 30,000 volts and even higher. In Fig. 1 this voltage is produced by a radio frequency powered supply having a radio frequency oscillator and a voltage rectifier-multiplier circuit in which I have chosen to illustrate one adaptation of my invention. This supply is contained within the dotted lines 28 and is connected with the tube 26 by resistor 29' and the lead 29.

I have found that with the application of extremely high voltages of the order generated by the power supply 28 there is a possibility of danger to the projection tube by reason of the accelerating voltage arcing through the tube to ground. I have been able to overcome this arcing or flashback by limiting the current to the second or accelerating anode by means of the series resistor 29' whereby the current is limited to a value below that required to cause and sustain arcing. Moreover, with this high series resistance 29', which may be of the order of 200 megohms when voltages upwards of 50 kilovolts are used, it is possible to obtain increased picture brightness with substantially lower beam currents than are customary in conventional practice as I know it. These reduced beam currents also provide improved picture contrast and definition since the beam can be focused to produce a much smaller spot than would otherwise be obtainable with larger currents.

The operation of voltage multiplier-rectifier circuits of the type shown at 28 in Fig. 1 is discussed in my copending application for U. S. patent, Serial No. 777,955, and entitled "Television." Briefly, however, it includes an oscillator tube 30 in circuit with windings 33 and 34 of the radio frequency transformer 31. Other elements in the oscillator circuit include the grid-leak and condenser 35 and 36, a plate battery or equivalent voltage supply 37, and means for heating the filament of the tube 30, the latter having been omitted to simplify the drawing.

The oscillator voltage developed across the winding 33 of the transformer 31 is dependent on the voltage applied to tube 30 by the battery 37. As an example, this developed voltage may be of the order of 300 volts. The transformer 33 may step up this voltage as much as thirty times to produce a voltage across the winding 38 of the order of 9,000 volts.

The multiplier-rectifier circuit includes in this embodiment five rectifier tubes 39 to 43 inclusive and nine condensers 44 to 48 inclusive. In the operation of this circuit, condenser 44 is charged to a voltage equal to the voltage appearing across winding 38 while each of the remaining pairs of series connected condensers are charged to twice that value. In the illustrated circuit the high voltage is produced between ground (the lower side of winding 38) and the filament of the last tube 43. The charge on each of the condensers 44, 46 and 48 determines the output voltage. For example, let it be assumed that the winding 38 delivers 9,000 volts, then the sum of a 9,000 volt charge on condenser 44 and an 18,000 volt charge on condensers 46 and 48 would equal the output voltage or 45,000 volts. Since the voltage is actually multiplied five times, an arrangement or circuit which includes five tubes is commonly termed a quintupler.

From the foregoing description of the power supply 28 it is evident that the filaments 39', 40', etc. of tubes 39, 40 etc. operate at different potential levels. For instance, filament 39' is at a potential level of 9,000 volts above ground, filament 41' is at 27,000 volts, and filament 43' is at 45,000 volts. Prior methods of heating filaments of tubes in circuits of this type included a tuned radio frequency circuit energized by the radio frequency current flowing through the tube. This arrangement of course results in the application of voltage to the plates of the rectifier tubes simultaneously with the application of the filament voltage and substantially shortens the life of the tubes. Moreover, special low filament current tubes had to be employed because of the limited radio frequency power available with the use of reasonably sized components such as transformer 31 and the oscillator tube 30, critical adjustment of each resonant circuit for heating the tubes was required which necessitated fairly stable oscillator circuits and internal capacities of the rectifier tubes themselves, and elaborate precautions to prevent interference with the television receiver had to be taken.

I have found that these difficulties can be overcome by providing means whereby the tube filaments can be heated from a relatively low frequency source such as 60 cycles, 400 cycles and even higher frequencies and maintain the necessary insulation between each filament so that very high voltages can be developed. In this way the voltage on the filament of each tube is completely independent of the radio frequency power source and tubes having relatively high filament currents can be employed. Moreover, it is possible with my system to heat the filaments before the application of plate voltage thereby prolonging the life of the tube. With this new circuit the practical limit of high voltage that can be generated is increased since all of the radio frequency power can be used for attaining the high voltage without having to divert part for heating the tubes.

In the power circuit shown in Fig. 1, each tube 39, 40, etc., is heated in the same manner and therefore only the circuit associated tube 39 will be described. This circuit includes a magnetic field generating coil 50 connected with an alternating current source. Spaced from the coil 50 is a second coil 51 connected in parallel with the filament 39' by leads 49 and 49'. The coil 51 is insulated from ground and from the coil 50 so that operating potentials of the order previously discussed can be applied therebetween without danger of breakdown. The magnetic field generated by coil 50 is intercepted by the coil 51 and the voltage induced therein is sufficient to heat the filament.

Figure 2:
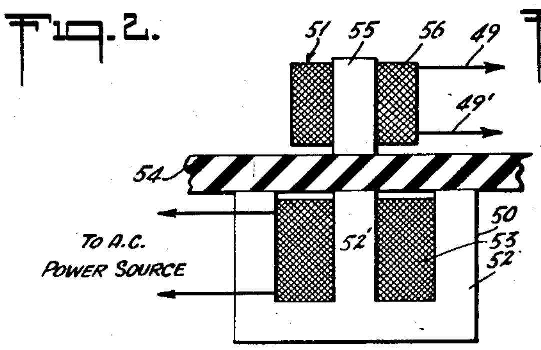
Fig. 2 is a diagrammatic view of certain elements of the invention.

Fig. 2 illustrates one method of employing my invention to obtain very high voltage insulation. There the magnetic field generating coil 50 is placed beneath a suitable thickness of dielectric material 54 and preferably consists of an E-shaped iron core 52 having a coil 53 wound on the center leg 52' thereof. The coil is connected with a suitable A. C. source and generates a strong magnetic field penetrating the dielectric. The filament heating coil 51 is positioned on the top side of the dielectric 54 and may include a straight iron core 55 surrounded by the coil 56. This coil is preferably positioned with its core vertically disposed over the central leg 52' of the E-shaped core 52, since the greatest transfer of power will thereby obtain. The thickness of the dielectric 54 is governed by the desired insulation required and of course the character of the dielectric material. With the use of a material formed of fused mica and glass and having a thickness of about one-half inch, I have been able to apply potential differences between each generator and its associated filament heating coil of as high as 100,000 volts without danger of arc over.

Figures 3, 4:
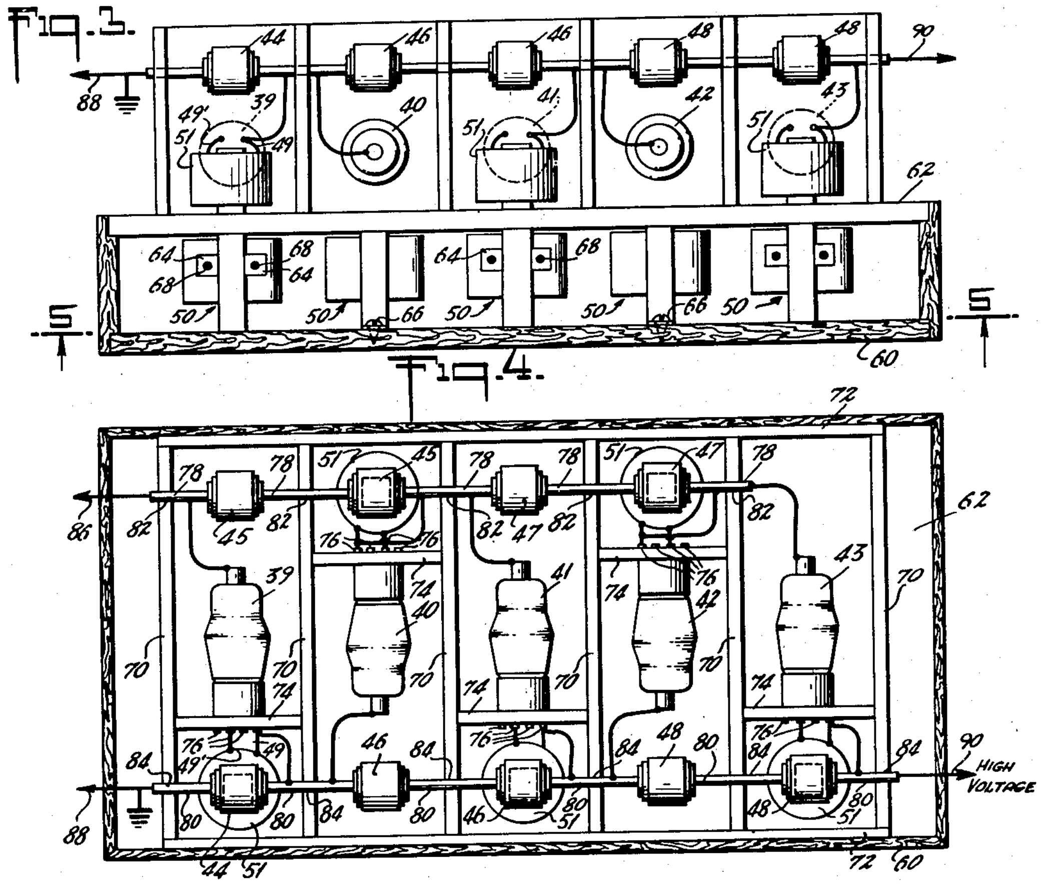
Figs. 3, 4 and 5 are side, plan and bottom diagrammatic views, respectively, more particularly illustrating certain features of the invention.
Figure 5:
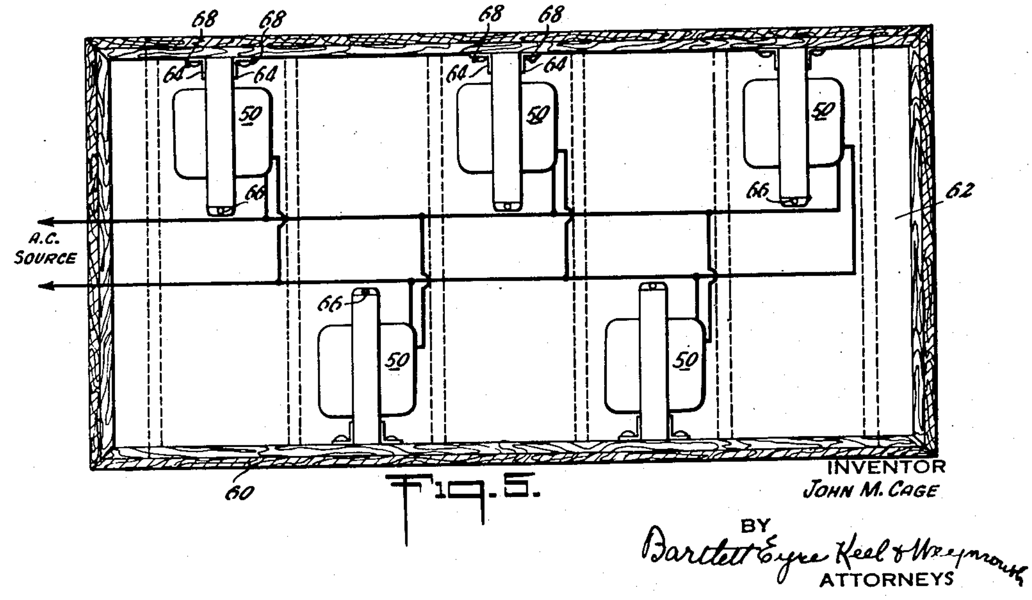

Figs. 3, 4 and 5 illustrate one method of constructing a high voltage power supply of the type shown in Fig. 1 embodying my invention. Like numbers in each of these figures denote like elements.

Briefly, this supply includes a box-like base 60 of wood or other similar inexpensive non-conducting material and having a suitable grooved upper edge for the reception of a relatively thick dielectric sheet or panel 62. This sheet in fragmentary form in Fig. 2 was designated by the numeral 54. Within the base 60 five magnetic field generating coils 50 are positioned in the manner illustrated and secured to the base by suitable means such as the lugs 64 and 66 and wood screws 68. By fastening the coils 50 in this manner, the necessity for inserting screws into or through the dielectric panel 62 is avoided. These coils may be designed to operate in either a series, parallel or series-parallel arrangement and are connected to a suitable alternating current source in the manner illustrated.

The five rectifier tubes 39 to 43 inclusive are mounted on the top side of the panel 62 in a substantially horizontal position with each successive tube being inverted. A series of transverse vertical partitions 70 separate the individual tubes and ends of each compartment are closed by longitudinal partitions 72 (Fig. 4). Between each of the partition members 70 are small vertical walls 74 having sockets formed therein for reception of the tube prongs 76 of the tubes 39, 40, etc. The condensers 44 to 48 inclusive are arranged in two series or banks one consisting of four condensers 45—45 and 47—47 connected in series by suitable tubular connecting pieces 78. and the other consisting of five condensers 44, 46—46 and 48—48 connected in a similar manner by tubular pieces 80. These two banks are supported above and to each side of the row of tubes by slots 82 and 84 in partition 70.

To energize the tube filaments, a coil 51 having a vertically disposed iron core is mounted in any suitable manner at the base of each tube with its core preferably directly above the center leg of the core of its associated coil 50 as shown in Fig. 2. The terminals of each of these coils is directly connected with the filament prongs of its associated tube and are indicated at the base of tube 39 by the numerals 49 and 49', the other tubes being similarly connected.

The remaining connections between the several condensers and the tubes are clear from the drawings and a description thereof is not deemed necessary.

To operate the circuit, the terminals of the winding 38 of transformer 31 are connected with the leads 86 and 88 leading from the left side of the condenser banks. Assuming an R. F. voltage of 9,000 volts across these leads and a suitable A. C. voltage applied to coils 50, a voltage of 45,000 volts will be developed between the output terminal 90 and the ground wire 88.

I have found that with the above arrangement I have been able to apply a voltage of as high as 20,000 volts between the leads 86 and 88 and develop output rectified voltages of as high as 100,000 volts.

Because the filaments of the tubes are independent of the R. F. supply voltage, as far as power requirements are concerned, considerably less power is required from the oscillator tube 30 and transformer 31 (Fig. 1). Moreover, the oscillator tube 30 of an indirectly heated type and the rectifier tubes 39—43 of directly heated type, if power is applied to both simultaneously, the tubes 39—43 will be fully heated and ready to operate before the tube 30 will warm up and generate radio frequency power across the terminals 86 and 88 of the rectifier-multiplier unit. This will greatly prolong the rectifier tube life.

Figure 6:
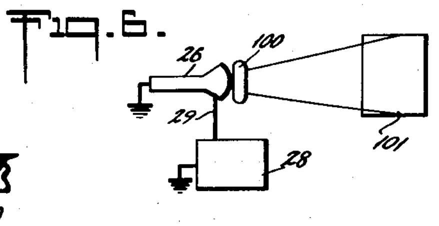
Fig. 6 is another embodiment thereof.

I have also found with my invention that since the tubes 39 to 43 inclusive are heated by a very low frequency voltage such as one having a frequency of 60 cycles per second rather than by radio frequency power when the circuit is used with a television reproducing tube such as the tube 26 (Fig. 1), the reproduced image is relatively free from distortion produced by the generation and use of radio frequency power for developing the high accelerating voltage for the tube. This is illustrated in Fig. 6 which shows an image projection tube 26 connected with a voltage multiplier power supply 28 embodying my invention. In this application a suitable objective lens system 100 is employed to focus the image on the screen 101. Since the image formed on the face of the projection tube 26 is less distorted by reason of the substantial elimination of unwanted radio frequency signals from the power supply, it is possible to project images on screens as large as six feet by eight feet and even larger, without incurring noticeable distortion from that source. Moreover, since the energy used to heat the filaments of the rectifier multiplier tubes is independent of the oscillator circuit, the oscillator can be quickly and easily tuned to any desired operating frequency for optimum image reproduction without the necessity of returning the filaments each time a slight frequency change is made.

It is also evident that with my invention tubes having relatively high filament power requirements can be employed without affecting the radio frequency oscillator or unduly loading it. Since tubes of this character usually are more rugged and dependable than the special low drain tubes used in conventional multiplier circuits, greater stability and dependability is attained. Since I have been able to reduce the R. F. power requirements of the circuit and have also eliminated many special components, this increased stability and dependability can be attained at a substantially lower cost.

What is claimed is:

1. A radio frequency powered voltage multiplier-rectifier comprising a dielectric panel having at least two rectifier tubes mounted transversely thereof with each successive tube inverted, a plurality of dielectric barriers fastened to said panel and forming individual compartments for said tubes, at least two condensers supported by said barriers and transversely of the tubes, said condensers and tubes being connected to each other and with a radio frequency oscillator to form a multiplier, rectifier circuit, an iron core coil mounted at the base of each tube with its terminals connected to the tube filament, and at least one magnetic field generating coil disposed on the other side of said panel, said last mentioned coil being connected with a relatively low frequency alternating current source whereby the field generated thereby induces sufficient voltage in each filament coil to heat the filaments of said tubes independently of the radio frequency oscillator.

2. A radio frequency powered multiplier-rectifier circuit according to claim 1 wherein the magnetic field generating coil is energized by an alternating current having a frequency of about 60 cycles per second.

3. A radio frequency powered voltage multiplier-rectifier circuit comprising a dielectric panel having at least two rectifier tubes mounted transversely thereof with each successive tube inverted and connected to form a multiplier circuit, an iron core coil mounted at the base of each tube with its terminals connected to the tube filament, and at least one magnetic field generating coil disposed on the other side of said panel, said last mentioned coil being connected to generate a magnetic field and thereby induce sufficient voltage in each filament coil to independently heat the filament of each tube.

4. In a multiplier-rectifier circuit for furnishing high voltage to an image reproducing tube, the combination of at least two rectifier tubes connected in circuit across a radio frequency voltage supply to rectify and multiply the radio frequency voltage and an individual coil including an open-ended core for said coil connected with the filament of each tube, means spaced from said coils for generating an alternating current field in the vicinity of said coils and a dielectric barrier separating said coils from said field generating means.

5. In a multiplier-rectifier circuit for furnishing high voltage to an image reproducing tube, the combination of at least two rectifier tubes connected in circuit across a radio frequency voltage supply to rectify and multiply the radio frequency voltage and an individual single winding coil including an open-ended core for said coil connected with the filament of each tube, means spaced from said coils for generating an alternating current field in the vicinity of said coils and a dielectric barrier separating said coils from said field generating means.

6. A power supply comprising a closure of dielectric material formed with at least two individual compartsments, voltage multiplying stages in each compartment, each including at least one electron tube and means for heating the filaments of said tubes including an electromagnetic field generator external to said closure, and means within said closure connected with the filaments and responsive to said field to produce filament heating currents.

7. A power supply comprising a hollow base member having electromagnetic field generating means therein, dielectric means enclosing said base member, an upper housing of dielectric material, at least two interconnected voltage multiplying stages in said upper housing, each stage including at least one tube and means individual to each tube and responsive to said field for heating the filament of its associated tube.

JOHN M. CAGE.

REFERENCES CITED

The following references are of record in the file of this patent:

UNITED STATES PATENTS

| Number | Name | Date |
|---|---|---|
| 1,666,473 | Slepian | Apr. 17, 1928 |
| 1,823,463 | Mutscheller | Sept. 15, 1931 |
| 2,045,034 | Kuntke | June 23, 1936 |
| 2,059,683 | Farnsworth | Nov. 3, 1936 |
| 2,104,463 | Johnson et al. | Jan. 4, 1938 |
| 2,163,218 | Schlesinger | June 20, 1939 |
| 2,213,199 | Bouwers et al. | Sept. 3, 1940 |
| 2,302,900 | Vance | Nov. 24, 1942 |
| 2,352,988 | Wilcox | July 4, 1944 |

OTHER REFERENCES

TV HV RF Supplies, RCA Review, March 1947, vol. 8, #1, page 55.